Jan. 14, 1941.  R. HAMILTON  2,228,454
TRACTOR
Filed Nov. 1, 1938  3 Sheets-Sheet 1

INVENTOR.
Rush Hamilton
BY Oscar A. Mellin
ATTORNEY

Jan. 14, 1941.  R. HAMILTON  2,228,454
TRACTOR
Filed Nov. 1, 1938  3 Sheets-Sheet 3

INVENTOR.
Rush Hamilton
BY Oscar A. Mellin
ATTORNEY

Patented Jan. 14, 1941

2,228,454

UNITED STATES PATENT OFFICE 2,228,454

TRACTOR

Rush Hamilton, Marysville, Calif.

Application November 1, 1938, Serial No. 238,183

8 Claims. (Cl. 180—1)

This invention relates to motor vehicles of the tractor type which are specially adapted to travel over rough and uneven ground.

It is the principal object of the present invention to provide an improved tractor of the four-wheel type wherein the steering and driving wheels at each side of the tractor are mounted on an oscillating frame pivoted about a horizontal axis disposed intermediate said wheels, with the frames on opposite sides of the tractor being independently oscillatory in order that the wheels may automatically adjust themselves to unevenness in the ground contour, and with said frames being constructed and so relatively associated that both the wheel base and the tread of the tractor may be varied to suit the condition of use; and in which tractor the wheels are so controlled that the tractor will have a relatively short turning axis, the steering wheels being so mounted as to afford the operator an unobstructed view of the ground between said steering wheels, and the tractor having such ground clearance as to permit it to straddle a row of plants or an obstruction extending to a height appreciably above the hubs of its wheels.

In a practical embodiment of the invention, the driving and steering wheels at each side of the tractor are mounted on an oscillatory side frame, the opposed side frames being pivotally connected transversely at a point between the front and rear wheels for substantially vertical oscillation relative to each other to enable the tractor to travel over rough and undulating terrain with a minimum of side sway or longitudinal pitching of the tractor as a whole. The driving wheels at opposite sides of the tractor are provided with independent brake mechanisms and the steering mechanism is arranged to control the front wheels in such manner that the tractor may be turned about a center located within its own area.

To enable a lengthening of the wheel base of the tractor the said side frames are each of extensible construction, and to permit the width of tread to be varied, the pivotal connection between the two opposed side frames is also of an extensible nature.

To rear wheels are driven by a suitable motor through a clutch and differential transmission leading to driving members axially aligned with the pivotal connection of the two side frames and splined together to remain in driving relationship throughout any lateral adjustment of said side frames which may be necessary to vary the tread width of the tractor.

The two pairs of wheels are so mounted on the respective frames as to require no connecting fixed axle or axle housing, thus leaving between the wheels of each pair an unobstructed space which, combined with a relative high disposition of the pivotal connection between the two side frames, provides a ground clearance extending well above the wheel hubs, and, the operator's seat so positioned that he will have an unobstructed view of the ground between the steering wheels.

The invention is exemplified in the following description and illustrated by way of example in the accompanying drawings, in which.

Figure 1:
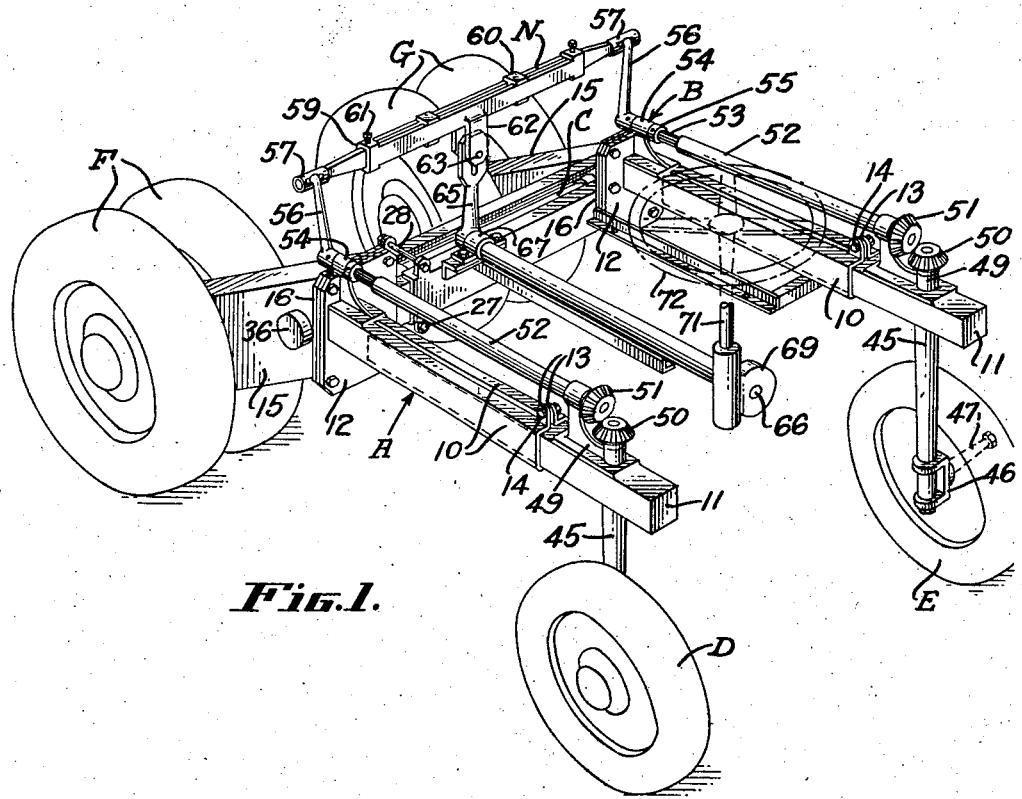
Fig. 1 is a perspective view of a tractor embodying the features of the present invention, the motor and its accessories, the driver's seat, and the clutch and brake pedals and connections being omitted in order to more clearly illustrate the frame construction and the steering mechanism.

In the accompanying drawings there is shown a tractor embodying in its construction the features of the present invention, in which tractor the supporting frame comprises two opposed longitudinal side frames (designated generally by the reference characters A and B) and a transverse pivotal connection (designated generally by the reference character C) by means of which the two side frames are pivotally connected at their medial portions for relative vertical oscillation about a transverse horizontal axis. Each of said side frames has a substantially horizontal forward portion of telescopic construction comprising a pair of structural steel channels 10 faced towards each other to form a substantially square tubular member in which is slidably mounted a square beam 11 constituting the front end of the side frame. The opposed channels 10 are welded or otherwise fixed at their rear ends to a butt plate 12 and are disposed in relatively spaced relationship to, in effect, form a longitudinally split square tube, and at their forward ends said channels are provided with upper and lower pairs of opposed ears 13 which are apertured to receive transverse clamping bolts 14 by means of which the opposed channels may be clamped around the companion beam 11 to secure said beam in its adjusted position and thus maintain the desired wheel base.

Steering wheels D and E are dependingly mounted on the front ends of the extensible beams 11 of the respective side frames and are associated with suitable steering mechanism, to be later described.

The driving wheels F and G are mounted in pairs on the rear ends of the respective side frames, each rear end portion of which comprises a rearwardly and downwardly projecting member 15 having at its upper forward end a transverse flange 16 bolted or otherwise rigidly secured to the butt plate 12 of its associated forwardly extended channels 10. Each pair of driving wheels is rotatably journaled on the respective side frames and is provided with a chain sprocket 17 and an associated drive chain 18, the side frame members 15 being of hollow construction to form chain housings for the respective drive chains and sprockets.

Obviously the tractor will be provided with suitable means to which may be attached a drawbar or other hitching arrangement, and for this purpose I provide at the rear end of each side frame an apertured member 19, preferably in the form of an angle iron welded to and forming an integral part of said side frame.

Figure 3:
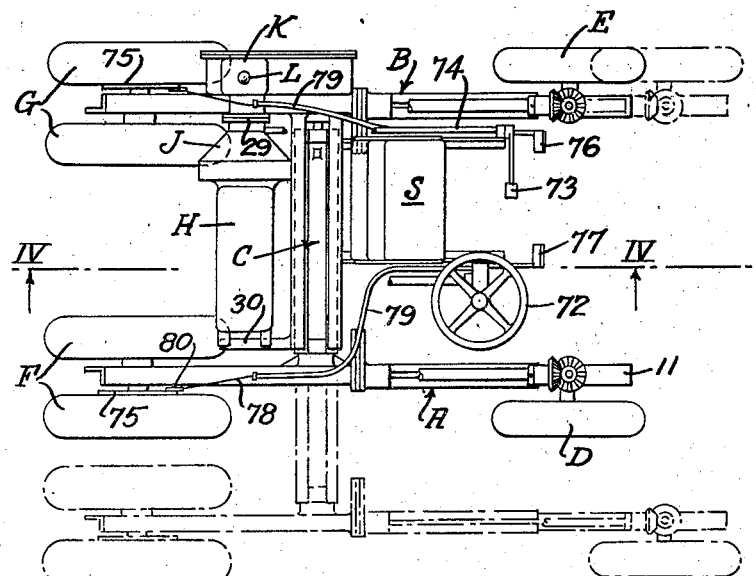
Fig. 3 is a plan view of the tractor, illustrating in dotted lines the extensibility of the frame longitudinally to increase the wheel base and transversely to increase the tread.

From an inspection of Fig. 3 of the drawings, it will be observed that the steering wheel and the outer driving wheel on each side of the tractor are normally longitudinally aligned to track each other. Thus it will be evident that the inner driving wheels serve merely to gain added driving traction and may be removed whenever desired or when necessary for the purpose of providing a wider unobstructed space between the opposite driving wheels.

Figure 4:
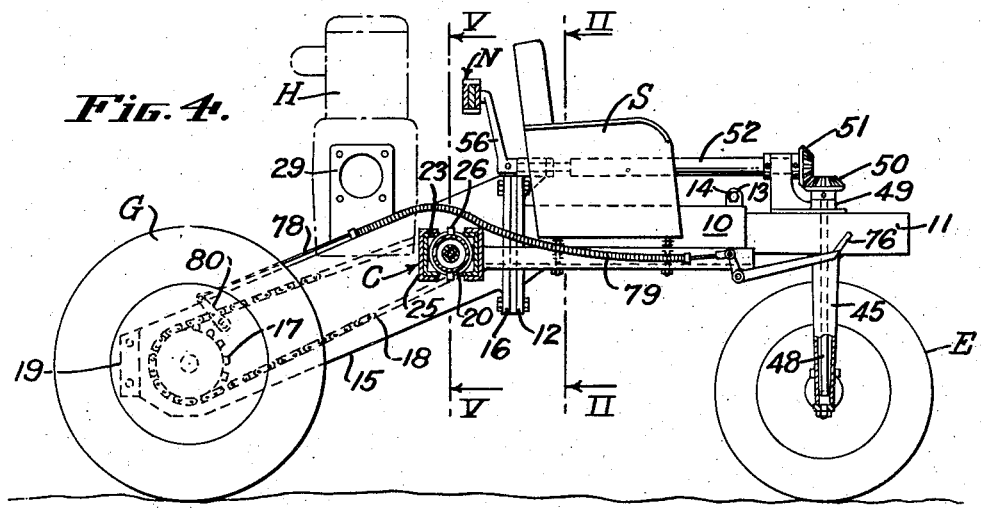
Fig. 4 is a longitudinal vertical section taken on the line IV—IV of Fig. 3, the motor being indicated in dotted lines.

The pivotal connection C of the opposed side frames will now be described, with particular reference to Figs. 4, 5 and 6 of the drawings. This connection not only pivotally connects the opposed side frames for relative vertical oscillation but is also of an extensible character in order to permit an appreciable degree of relative transverse adjustment of the two side frames to vary the tread width of the tractor, and to this end the extensible pivotal connection C comprises an elongated tubular pivot member 20 secured to the chain housing member 15 of the side frame A and extended transversely to a point adjacent the opposed side frame B. This pivot member 20 is journaled to oscillate in transversely spaced bearing collars 21 and 22 which are positioned between the opposite ends of a pair of structural steel channels 23 faced towards each other in spaced relationship, as shown in Fig. 3, said collars being welded or otherwise joined to said channels to form a rigid structure.

Figure 5:
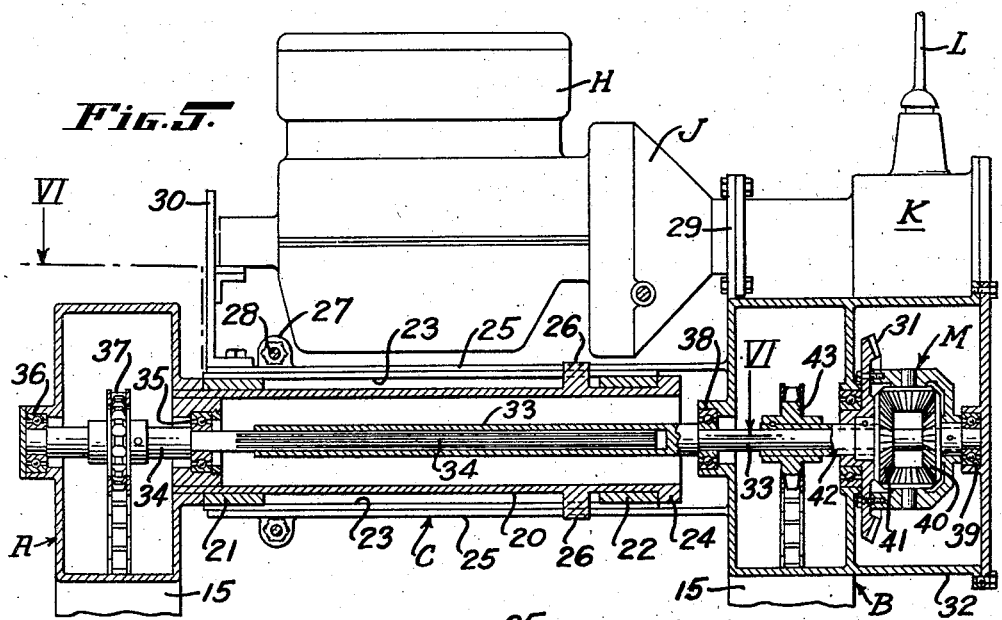
Fig. 5 is an enlarged transverse vertical section taken on the line V—V of Fig. 4.
Figure 6:
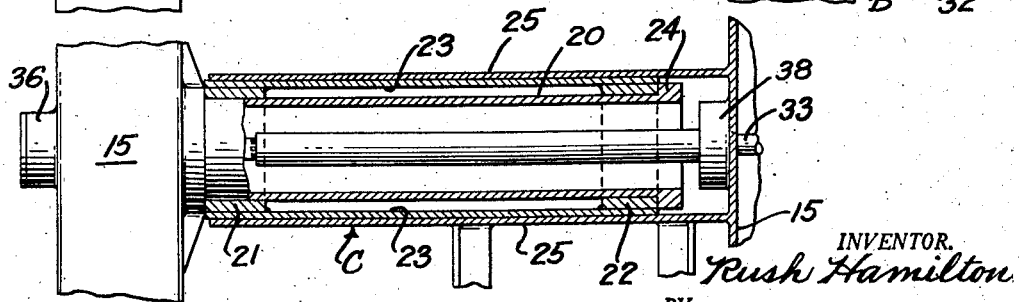
Fig. 6 is a fragmentary transverse horizontal section taken on the line VI—VI of Fig. 5.

As shown in Figs. 5 and 6, the bearing collar 21 abuts against a boss on the side frame A and the bearing collar 22 is engaged by a flange 24 formed on the free end of the pivot member 20, so that while said pivot member may oscillate in the bearing collars of this inner channel structure, said channel structure is carried with said pivot member during any axial adjustment thereof.

The joined inner channels 23 are slidably nested between two relatively spaced outer channels 25 which are secured at one end to the chain housing member 15 of the side frame B and face each other to embrace the inner channels 23 and form a slideway therefor.

To limit the degree of relative oscillation between the two side frames, the tubular pivot member 20 is provided with external stop lugs 26 positioned to engage the longitudinal edges of the opposed inner channels 23, and to clamp the telescoping channels together in adjusted position, the free ends of the outer channels 25 are provided with upper and lower pairs of ears 27 which are apertured to receive clamping bolts 28 by means of which said outer channels may be clamped on the inner channels 23 of the opposed side frame. The two opposed side frames are thus joined by a pivotal connection which is transversely adjustable to vary the tread width of the tractor and which may be clamped in adjusted position to maintain the desired tread width, without affecting the pivotal function of the connection.

The power means employed to drive the tractor may consist of any preferred type of motor, that shown in outline in the drawings being the more or less conventional internal combustion motor H which I mount on the side frame B by means of brackets 29 and 30 secured respectively to said side frame and to the free end of the rear channel 25 of the transverse connection C, which motor includes the usual clutch mechanism enclosed in a clutch housing J and the usual speed change transmission enclosed in the transmission housing K and actuated by the conventional type of gear-shift lever L. Said speed change transmission is in driving connection with the ring gear 31 of a differential M of the well known planetary gear type, which differential is enclosed within a differential housing 32 attached to the adjacent side frame B, and is mounted on one section 33 of a two-part extensible drive shaft of telescopic construction, the companion section 34 thereof being slidably splined within the adjacent tubular end of the shaft section 33, as shown in Fig. 5 of the drawings.

The drive shaft section 34 is journaled in an inner bearing 35 disposed in the tubular pivot member 20 adjacent the chain housing 15 of the side frame A and in an outer bearing 36 disposed in the outer wall of said chain housing, and secured on said shaft section 34 is a drive sprocket 37 disposed within said chain housing in position to be engaged by the drive chain 18 which leads to the driven sprocket 17 of the drive wheels F which are associated with the side frame A.

The section 33 of the drive shaft is journaled in an inner bearing 38 disposed in the inner wall of the chain housing 15 of the side frame B and in an outer bearing 39 disposed in the outer wall of the differential housing 32, and has secured to it the outer drive gear 40 of the differential. The opposed drive gear 41 of the differential is secured to a drive sleeve 42 which is journaled on the shaft section 33 and extends into the adjacent chain housing 15 of the side frame B, and, secured on such extended end of the drive sleeve 42 is a drive sprocket 43 disposed within said chain housing in position to be engaged by the drive chain 18 which leads to the driven sprocket 17 of the drive wheels G associated with the side frame B.

The extensible beam 11 of each side frame is provided with a fixed tubular steering wheel post 45 which extends downwardly and has vertically pivoted on its lower end a steering knuckle 46 of clevis form provided with a laterally extended stub axle 47 upon which the respective steering wheel is journaled. A vertical king-pin shaft 48 is journaled in a bracket 49 and extends downwardly through the beam 11 and the tubular post 45 and is secured at its lower end to the lower clevis arm of the steering knuckle 46, the steering wheel thus being independently vertically pivoted on the front end of the respective side frame. The upper end of this king-pin shaft 48 is provided with a bevel pinion 50 which meshes with a companion bevel pinion 51 secured on the forward section 52 of an extensible horizontal shaft.

The shaft section 52 is journaled in the bracket 49 and is of tubular form so as to receive its companion shaft section 53 to which it is slidably splined, the rear shaft section 53 being journaled in a bearing sleeve 54 formed on the butt plate 12 and being provided with a stop collar 55. Fixed to the rear end of the shaft section 53 is a steering arm 56 disposed normally in a more or less upright position.

Figure 2:
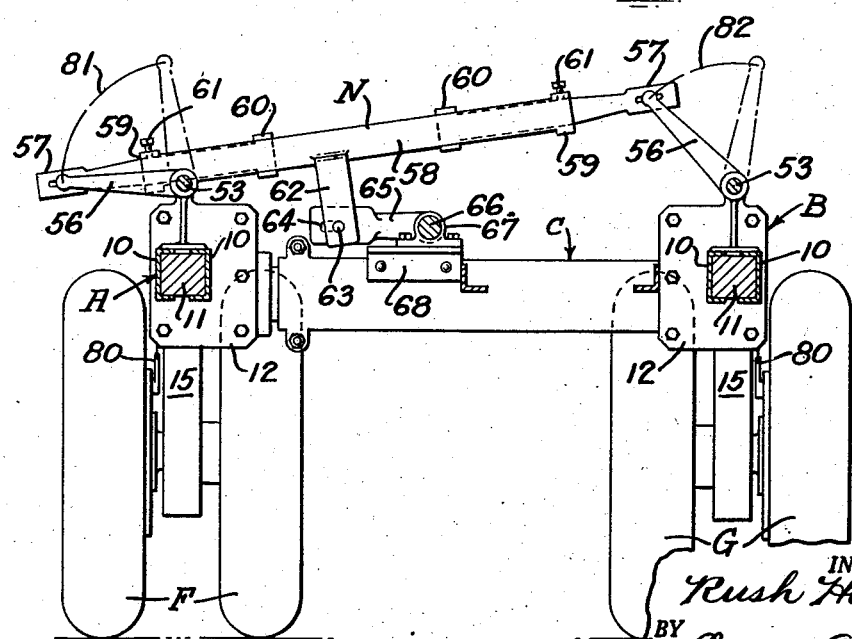
Fig. 2 is a transverse vertical section taken on the line II—II of Fig. 4, showing a portion of the steering mechanism as positioned for a short turning radius.

As illustrated in Figs. 1 and 2, the two steering arms 56 at opposite sides of the tractor have their upper ends pivotally connected, by the usual ball and socket connection, with a transversely disposed reach-rod N. This reach-rod is of extensible character and comprises terminal ends 57 and a medial member 58 providing relative spaced side walls which are connected at opposite ends by relatively short upper and lower walls to form at each end a substantially rectangular collar 59. Each terminal end 57 has a flat shank which extends through the adjacent collar 59 and between the side walls 58, and is provided at its inner end with guide ears 60 projecting laterally above and below the two side walls. This construction enables proper adjustment of the steering mechanism to be made and provides a relatively wide range of extensibility of the reach-rod to conform with the tread changing adjustments of the two opposed side frames. Clamp screws 61 mounted in the respective collars 59 of the reach-rod provide means for clamping the respective parts thereof in adjusted position.

Depending from the medial portions of the side walls 58 of the reach-rod N is a pair of relatively spaced ears 62 having mounted therein a laterally disposed pin 63 positioned to slide within an elongated slot 64 formed in the outer end of a steering lever 65. Said steering lever 65 is fixed on the rear end of a steering shaft 66 journaled in a shaft housing 67 which is supported in a shelf bracket 68 secured to the forward outer channel member 25 of the pivotal connection C. Within a steering gear housing 69 is the usual worm gear and pinion steering gears operatively connecting the outer end of the lateral steering shaft with the vertical steering shaft 71 carrying the hand wheel 72 by means of which the tractor is steered.

It will be evident that with a turning of the hand wheel 72, the steering lever 65 will be rocked to translate the reach-rod N and rock the respective steering arms 56 and thus actuate the steering mechanisms of the two steering wheels D and E.

On the side frame B and the associated forward channel 25 of the pivotal connection C, I mount a driver's seat S which is disposed between the forward extended portions of the side frames and is so aligned with the space between the steering wheels as to afford the operator an unobstructed view of the ground being straddled by the tractor so that he may very accurately steer the tractor over a row of plants or over such obstacles as may be encountered.

The drive of the tractor is controlled in the usual manner by a clutch pedal 73 disposed in front of the driver's seat and associated with a clutch shaft 74 leading rearwardly and into the clutch housing J.

The outer drive wheel of each pair thereof is provided with an independent brake device 75, of any preferred type, and each of said brakes is controlled by the driver by separate brake pedals 76 and 77. Any suitable type of brake operating connections may be provided between the respective brakes and their actuating brake pedals 76 and 77, each of such connections being shown in the drawings as a flexible pull wire or rod 78, partly encased in a flexible conduit 79 and connected at opposite ends to the respective brake pedal and to a brake actuating arm 80 associated with the brake device 75 of the respective drive wheel.

It is to be particularly noted that the drive shaft 34 and the drive sleeve 42, together with their associated drive sprockets and the differential M, are all axially aligned with the axis of the pivotal connection C which joins the two opposed side frames, so that the relative oscillation of said side frames will in no way adversely affect the driving mechanism, this disposition of the driving mechanism further being desirable since it permits elimination from between the drive wheels of the usual type of fixed differential and rear axle housing of the conventional motor vehicle, thus providing an unobstructed space between the rear wheels, and that the steering wheels are so mounted on the forwardly projecting portions of the respective side frames as to require no transverse fixed axle such as would obstruct the space between said steering wheels.

Figure 8:
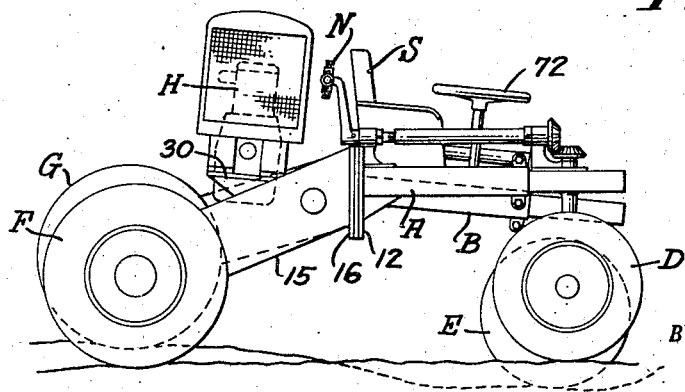
Fig. 8 is a diagrammatic plan view illustrating the two steering wheels positioned for a turn of minimum radius.

From the foregoing description it will be evident that I have produced a tractor in which the four supporting wheels are mounted on two relatively oscillatory side frames so that each side of the tractor may adapt itself to any unevenness of the ground over which its wheels travel, in the manner illustrated in Fig. 8, and in which the relatively high ground clearance permits the tractor to straddle plants or objects of a height extending above the wheel hubs, which, together with the unobstructed view had by the driver of the tractor of the ground between the steering wheels and immediately in front of the tractor, enables the driver to steer the tractor with exceptional accuracy over a row of plants or over stumps or rocks of considerable size and height.

It will also be evident that by reason of the extensible nature of the disclosed structure, I may readily change the wheel base or the tread of the tractor, or both the wheel base and the tread to adapt the tractor to the particular conditions of the work to be done and to the nature of the ground to be traversed.

Figure 7:
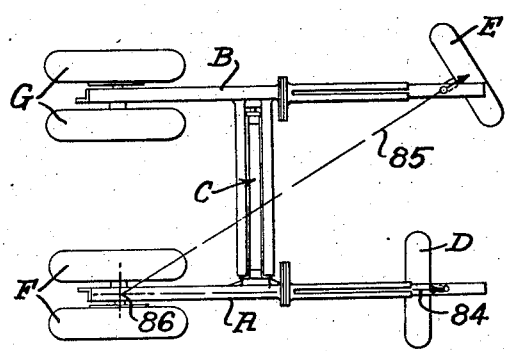
Fig. 7 is a side elevation of the tractor, illustrating the relative oscillation of the opposed side frames and wheels during travel of the tractor over uneven ground.

By reason of the fact that each of the steering wheels are capable of being turned through a ninety degree angle from its normal position, and by reason of the particular control had by the steering mechanism over the respective steering wheels, my improved tractor is capable of being turned about a center located within its own area, as diagrammatically illustrated in Fig. 7.

With particular reference to Fig. 2 in which the steering mechanism is shown as positioned for a right turn of minimum radius, with the normal positions of the two steering arms 56 being indicated in dotted lines, it will be seen that the right steering arm (in said view at the left) has been moved through the arc 81 while the opposed left steering arm has been moved through the lesser arc 82. The particular reason for this is that the near steering wheel D travels in an arc having a radius 84 while the off steering wheel E travels in an arc having a longer radius 85. Thus, in making this right turn of minimum radius about the center 86, which is within the area of the tractor, the near steering wheel D will be turned at right angles relative to the frame and to the radius 84, while the off steering wheel will be turned to a lesser angle relative to the frame but still at right angles to its travel radius 85.

While this difference in the turning of the respective steering wheels is quite perceptible in making a turn of relatively short radius, it will be obvious that during minor turning of the steering wheels, the upper ends of both of the steering arms 56 will travel along the top portions of the respective arcs 81 and 82 to produce a more equal turning of both steering wheels.

It will be pointed out that in making a relatively short turn on ground offering insufficient steering traction for the steering wheels, one or the other of the opposed driving wheels will be braked sufficiently to insure a proper turning of the tractor. In making the turn of minimum radius, as shown in Fig. 7, with the near steering wheel at right angles to the frame of the tractor, the near drive wheels will be braked to serve as the pivot of the turn while the entire driving effort is exerted by the off driving wheels in a manner well understood to those skilled in this art.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In a vehicle of the character disclosed, the combination of opposed longitudinal side frames each supported by a driving wheel and a steering wheel respectively mounted independently on its opposite ends to provide an unobstructed space between the wheels of each pair thereof, said side frames being pivotally connected for relative vertical oscillation about a transverse horizontal axis disposed between the driving and steering wheels, with said pivotal connection positioned an appreciable distance above the normal plane of the wheel axes to provide ground clearance extending to a substantial height above said plane, power means associated with said driving wheels, steering mechanism associated with said steering wheels, and an operator's seat mounted on one of said frames and disposed between said frames above and immediately behind said steering wheels to afford the operator an unobstructed view of the ground between said steering wheels, said ground clearance and said unobstructed space between both pair of wheels permitting the vehicle to straddle a row of plants, stumps, or other obstructions of such height as to extend above the hubs of the wheels.

2. In a vehicle of the character disclosed, the combination of opposed longitudinal side frames each supported by a driving wheel and a steering wheel respectively mounted on its opposite ends, said side frames being pivotally connected for relative vertical oscillation about a transverse horizontal axis disposed between the driving and steering wheels, power means associated with said driving wheels, steering mechanism associated with said steering wheels, and an operator's seat mounted on one of said side frames, the steering wheels being independently mounted on the side frames to provide an unobstructed space between said wheels and said seat being positioned between said frames above and immediately behind said steering wheels to afford the operator an unobstructed view of the ground between said steering wheels.

3. In a vehicle of the character disclosed, the combination of opposed longitudinal side frames pivotally connected for relative vertical oscillation about a transverse horizontal axis disposed intermediate the opposite ends thereof, a driving wheel mounted on one end of each side frame, a drive element for each driving wheel in driving connection therewith, both of said driving elements being disposed in axial alignment with the axis of oscillation of said side frames, a differential mechanism connecting said driving elements, power means associated with said differential mechanism, and a steering wheel mounted on the opposite end of each side frame.

4. In a vehicle of the character disclosed, the combination of opposed longitudinal side frames each supported by front and rear ground wheels respectively mounted on opposite ends thereof, a pivotal connection joining said side frames for relative vertical oscillation about a transverse horizontal axis disposed between the front and rear wheels, said pivotal connection being extensible to permit transverse adjustment of the side frames in relation to each other to change the tread width of the vehicle, and means for steering said front wheels, said means including a transverse extensible connection adjustable in conformity with said transverse adjustment of the side frames.

5. In a vehicle of the character disclosed, the combination of opposed longitudinal side frames pivotally connected at their medial portions for relative vertical oscillation about a transverse horizontal axis, each of said side frames having a front end portion extended horizontally forward from its medial portion and a rear end portion angled rearwardly and downwardly from said medial portion, a steering wheel mounted on the front end of each side frame, a driving wheel mounted on the rear end of each of said side frames, driving mechanism axially aligned with the pivotal connection of said side frames, power means associated with said driving mechanism, and steering mechanism for steering said steering wheels.

6. In a vehicle of the character disclosed, the combination of opposed longitudinal side frames pivotally connected at their medial portions for relative vertical oscillation about a transverse horizontal axis and having front end portions extended horizontally forwardly to provide an unobstructed intermediate space, driving wheels mounted on the rear ends of said side frames, power means associated with said driving wheels, steering wheels dependingly mounted on the respective forwardly extended front end portions of said side frames, each of said steering wheels being individually revoluble about a horizontal axis and pivotally mounted to turn about a substantially vertical axis, and said extended front end of each side frame being disposed above the top of its associated steering wheel to permit a ninety degree turning of said steering wheel, means for turning the steering wheels about their respective vertical axes to effect a turning of the vehicle, and an operator's seat facing forwardly and disposed above said intermediate space to afford the operator an unobstructed view of the ground between the steering wheels.

7. In a vehicle of the character disclosed, the combination of a complete chassis frame comprising opposed longitudinal side members pivotally connected for relative vertical oscillation about a transverse horizontal axis disposed intermediate the opposite ends thereof, a driving wheel mounted on one end of each of said members, a steering wheel mounted on the opposite end of each of said members, a single power means in driving connection with both of said driving wheels and mounted on one of said members to oscillate therewith, and steering mechanism associated with said steering wheels.

8. A vehicle as defined in claim 3, in which the pivotal connection of said side frames and of one of said driving elements are axially extensible to permit transverse adjustment of the side frames relative to each other to change the tread width of the vehicle.

RUSH HAMILTON.